(No Model.) 9 Sheets—Sheet 3.

H. J. GILBERT.
BARREL MACHINE.

No. 427,071. Patented May 6, 1890.

Witnesses:
W. C. Jirdinston.
Charles Billon.

Inventor:
Henry J. Gilbert
Peck & Rector
his Attorneys.

(No Model.) 9 Sheets—Sheet 4.

H. J. GILBERT.
BARREL MACHINE.

No. 427,071. Patented May 6, 1890.

Witnesses:
W. C. Jirdinston.
Charles Billow.

Inventor:
Henry J. Gilbert
by Peck & Pretor
his Attorneys.

(No Model.) 9 Sheets—Sheet 5.

H. J. GILBERT.
BARREL MACHINE.

No. 427,071. Patented May 6, 1890.

Witnesses:
W. C. Jirdinston.
Charles Billow.

Inventor:
Henry J Gilbert
by Peck & Peetor
his Attorneys.

(No Model.)  H. J. GILBERT.  9 Sheets—Sheet 6.
BARREL MACHINE.
No. 427,071.  Patented May 6, 1890.
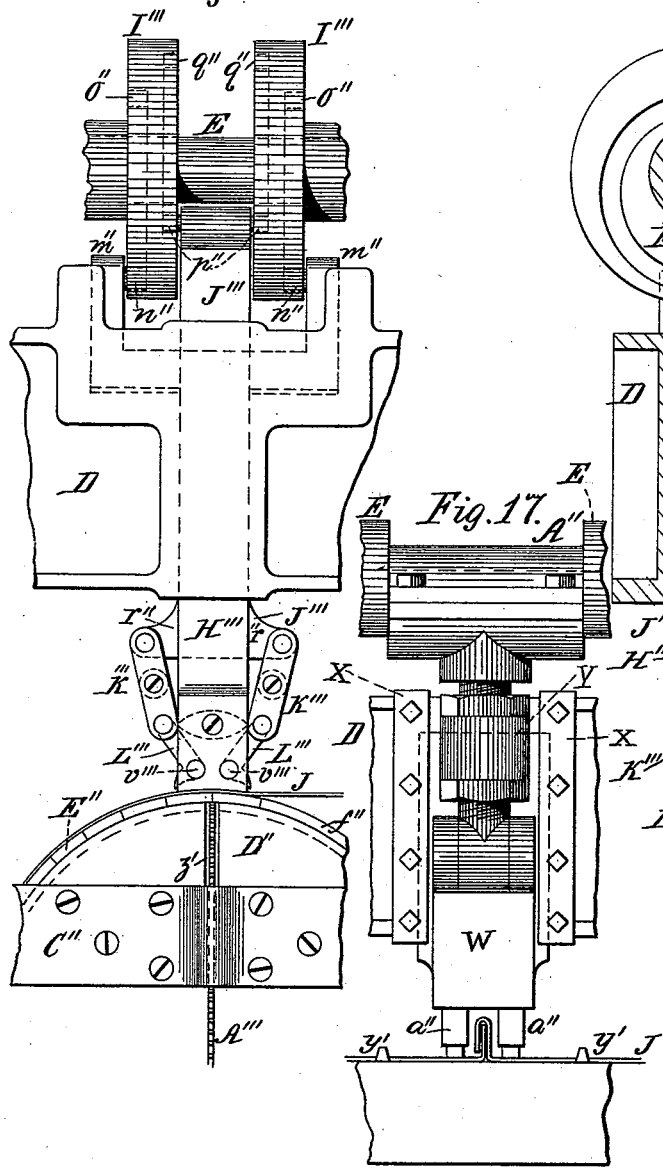
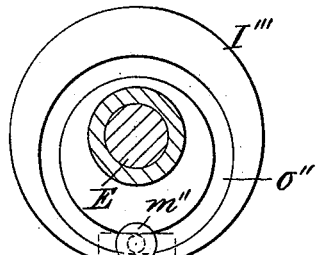
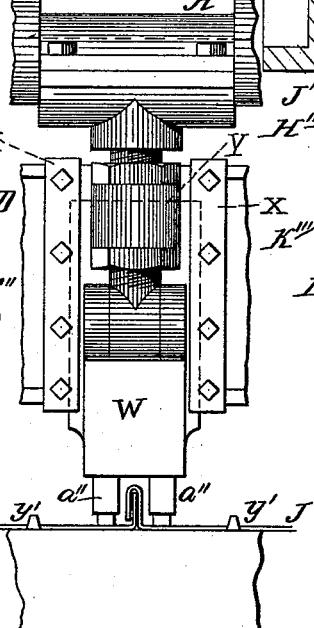
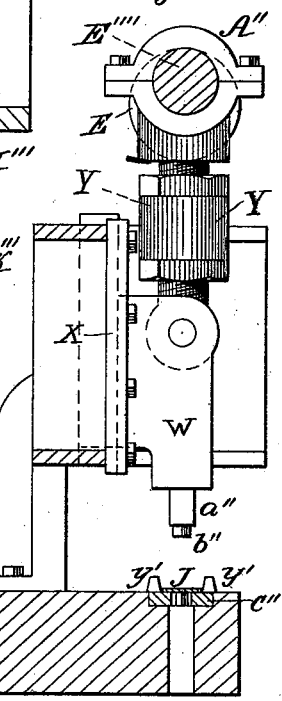
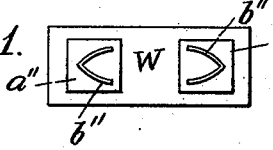
Witnesses:
W. C. Jirdinston.
Charles Billow.
Inventor:
Henry J Gilbert
by Peck & Rector
his Attorneys.

(No Model.) 9 Sheets—Sheet 7.
H. J. GILBERT.
BARREL MACHINE.
No. 427,071. Patented May 6, 1890.
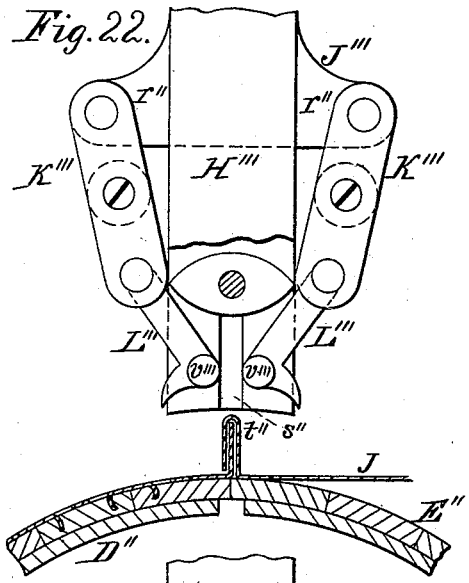
Fig. 22.
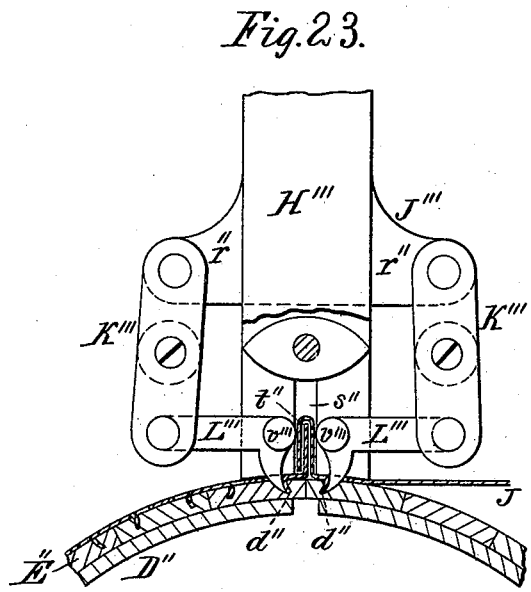
Fig. 23.
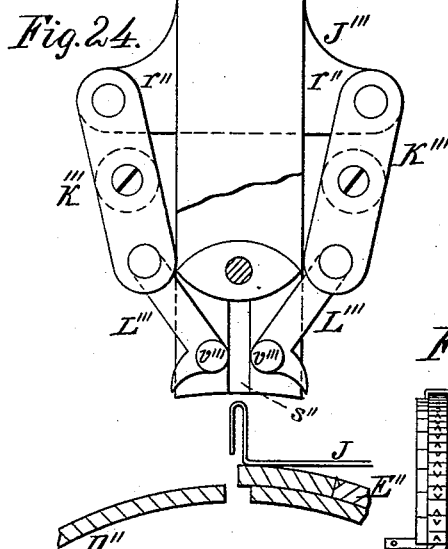
Fig. 24.
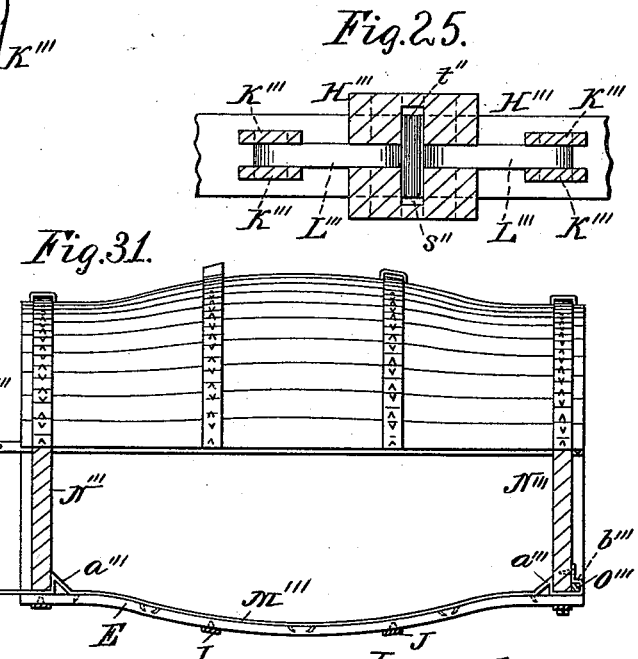
Fig. 25.
Fig. 31.
Witnesses:
W. C. Jirdinston.
Charles Billow
Inventor:
Henry J. Gilbert
by Peck & Rector
his Attorneys.

(No Model.) 9 Sheets—Sheet 8.
H. J. GILBERT.
BARREL MACHINE.
No. 427,071. Patented May 6, 1890.
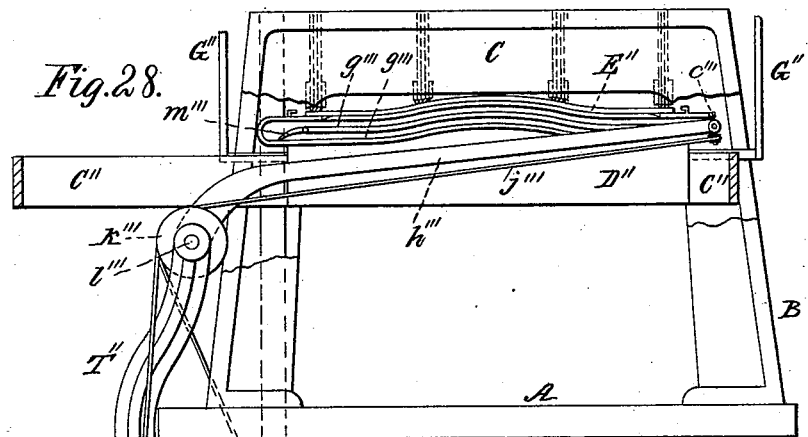
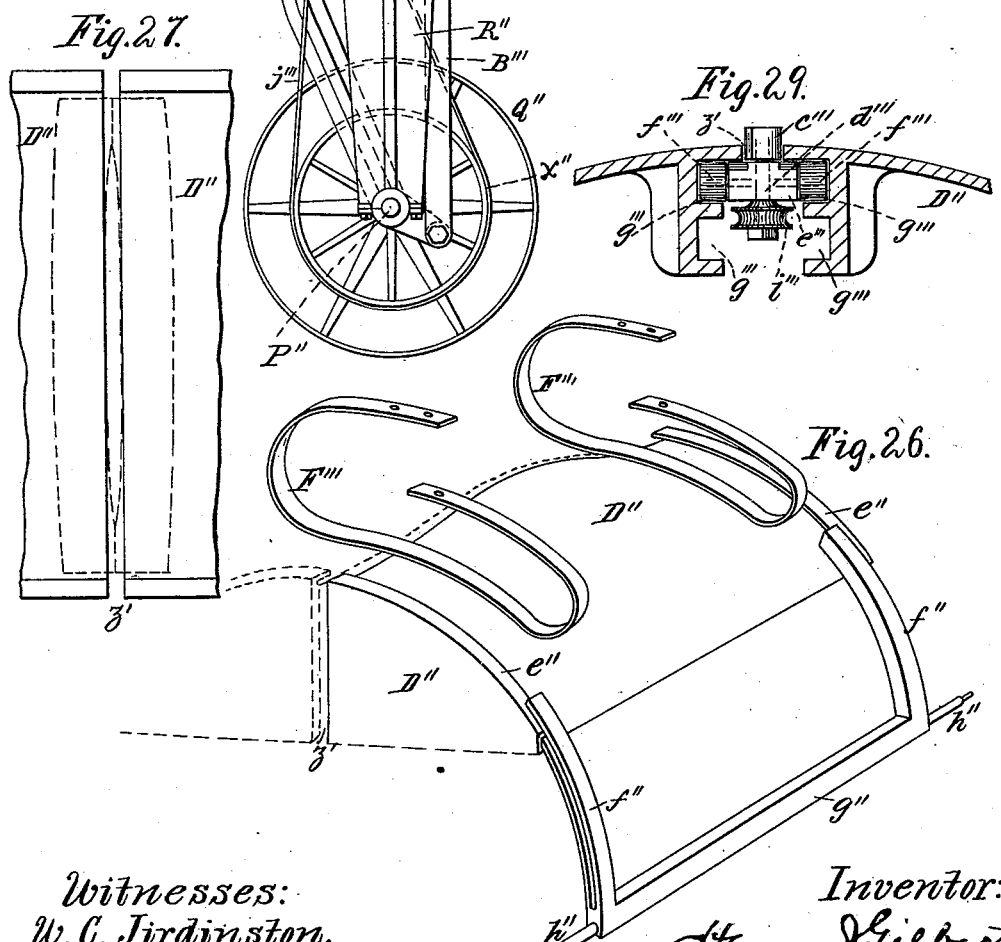
Witnesses:
W. C. Jirdinston.
Charles Billow.
Inventor:
Henry J. Gilbert
by Peck & Rector
his Attorneys.

(No Model.) 9 Sheets—Sheet 9.

H. J. GILBERT.
BARREL MACHINE.

No. 427,071. Patented May 6, 1890.

Witnesses:
W. C. Jirdinston.
Charles Billow.

Inventor:
Henry J. Gilbert
by Peck & Rector
his Attorneys.

UNITED STATES PATENT OFFICE.

HENRY J. GILBERT, OF SAGINAW, MICHIGAN.

BARREL-MACHINE.

SPECIFICATION forming part of Letters Patent No. 427,071, dated May 6, 1890.

Application filed September 21, 1888. Serial No. 286,028. (No model.)

*To all whom it may concern:*

Be it known that I, HENRY J. GILBERT, a citizen of the United States, residing at Saginaw, in the county of Saginaw and State of Michigan, have invented certain new and useful Improvements in Barrel-Machines, of which the following is a full, clear, and exact description, reference being had to the accompanying drawings, forming part of this specification.

My invention relates to machines for constructing barrels in which the staves are fed in, held to a former, and have the hoops secured thereto, so that when removed it is only necessary to connect the ends of the hoops and insert the heads in order to complete the barrel.

My invention has for its object the improved construction of this class of machines, and the novelty will be herewith set forth, and specifically pointed out in the claims.

Figure 1:
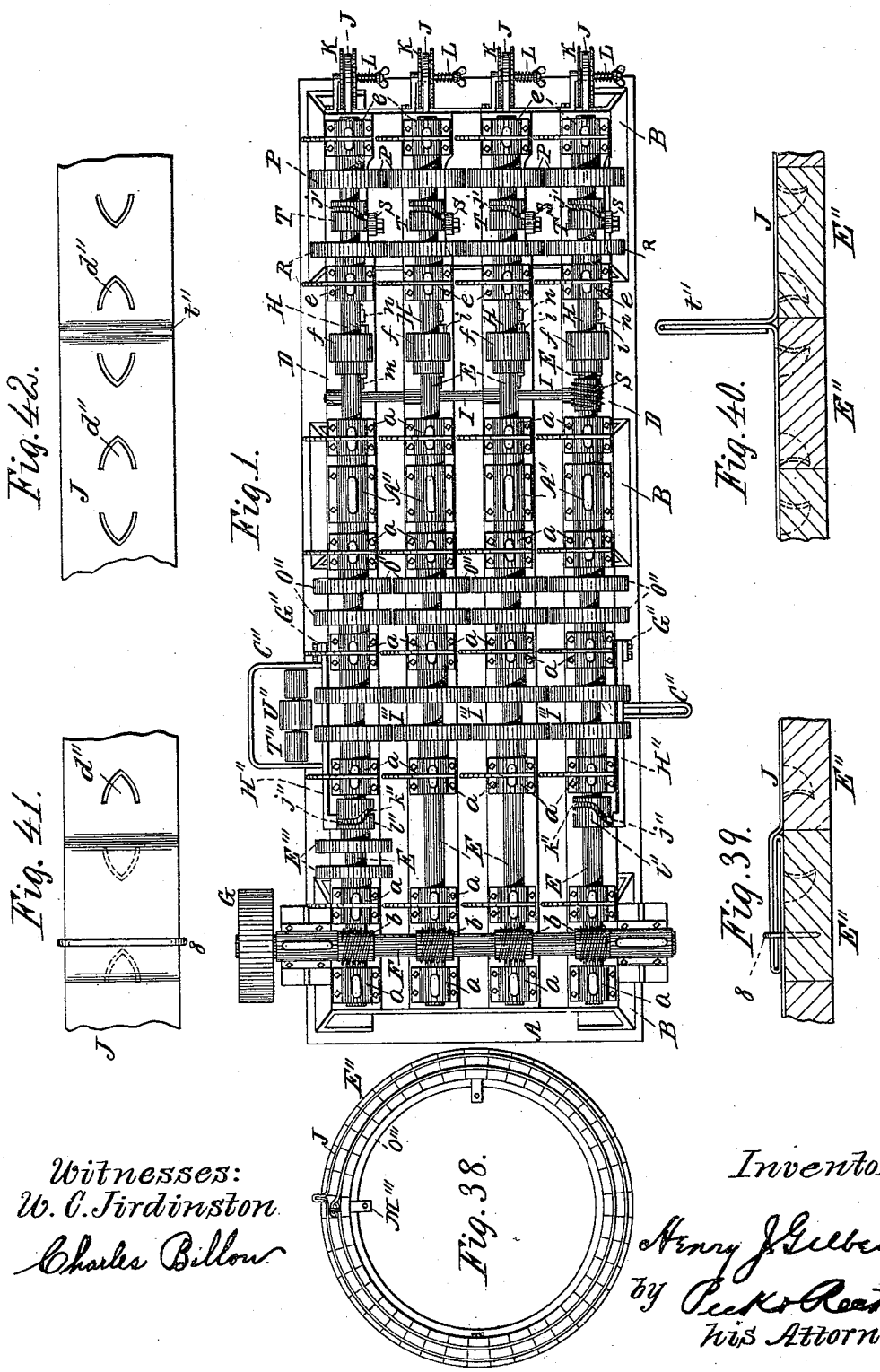
Figure 2:
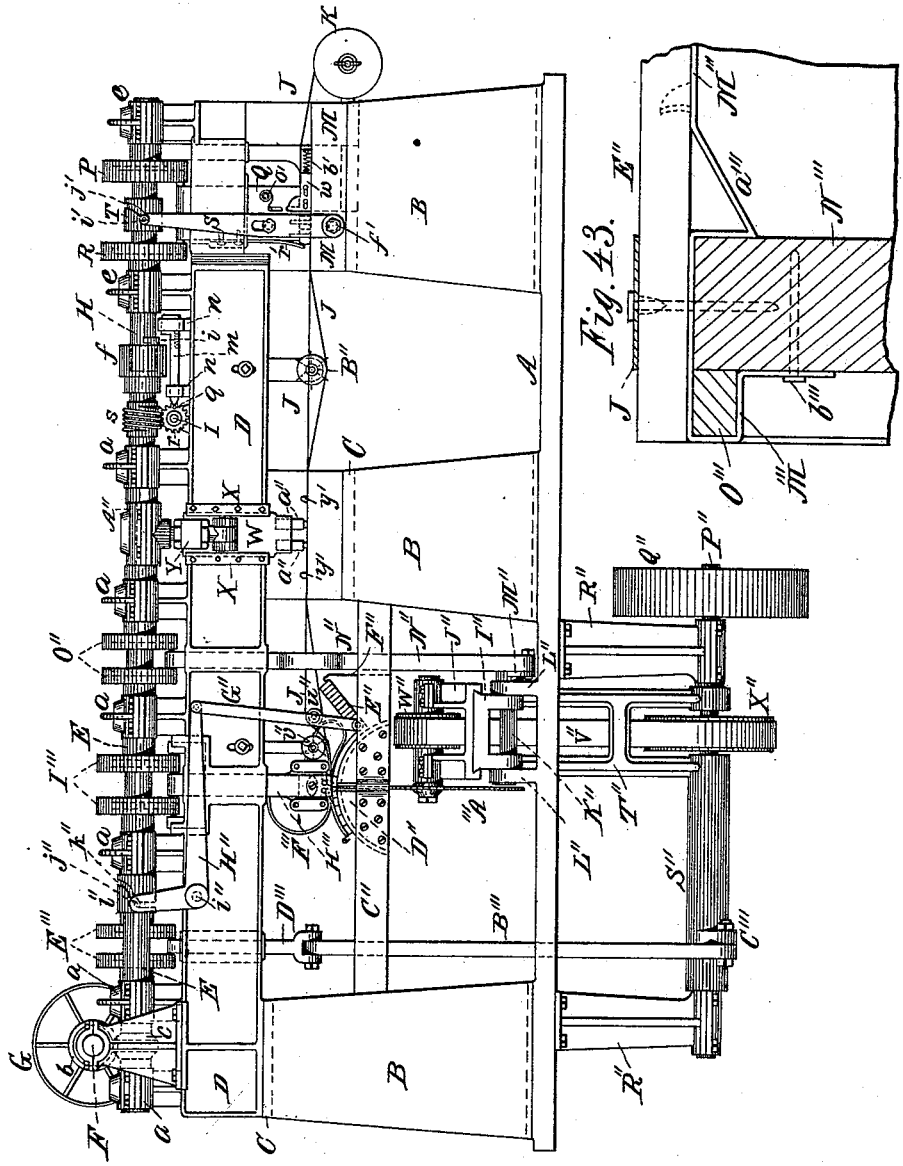
Figure 3:
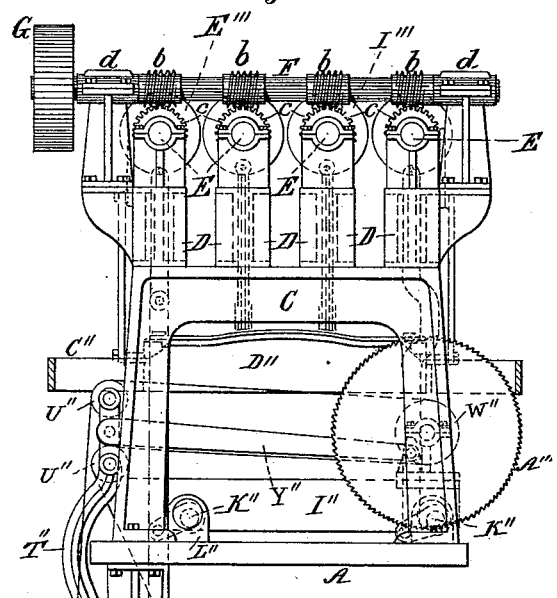
Figure 5:
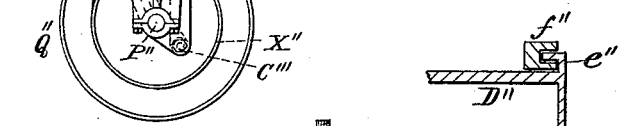
Figure 4:
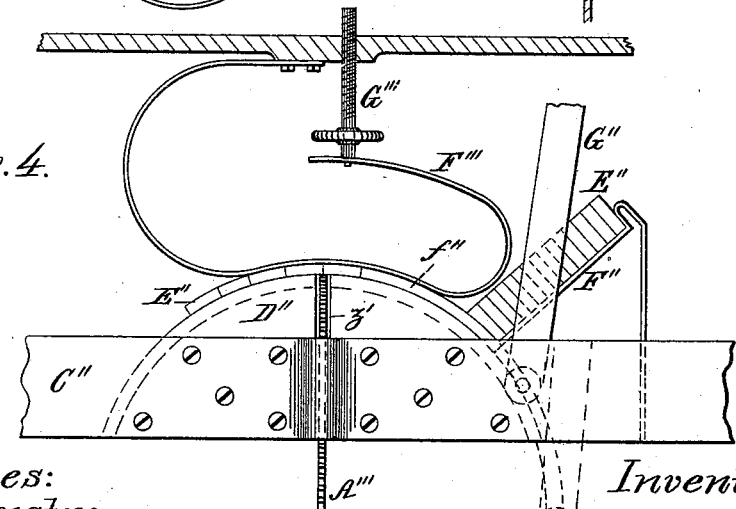
Figure 8:
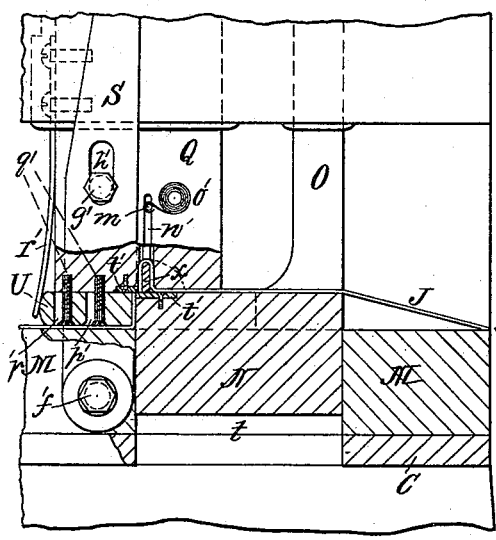
Figure 9:
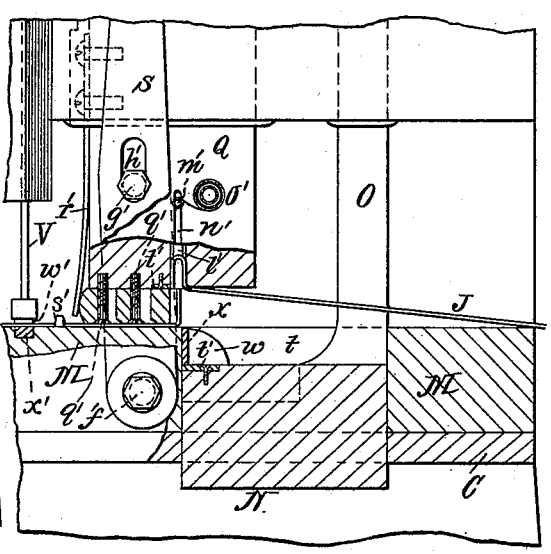
Figure 6:
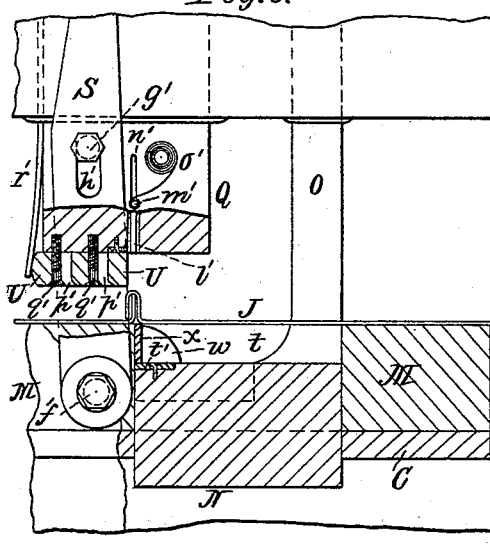
Figure 7:
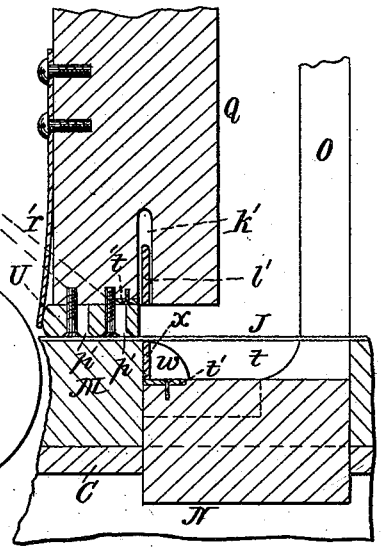
Figure 10:
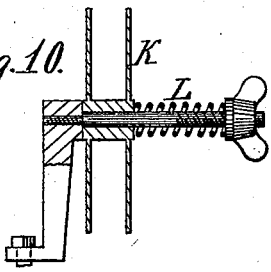
Figure 11:
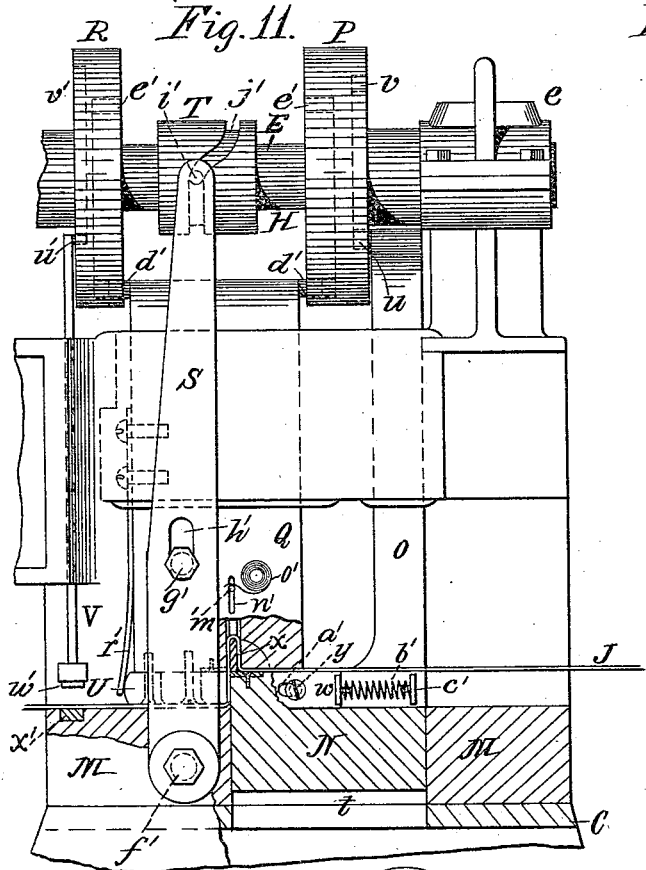
Figure 12:
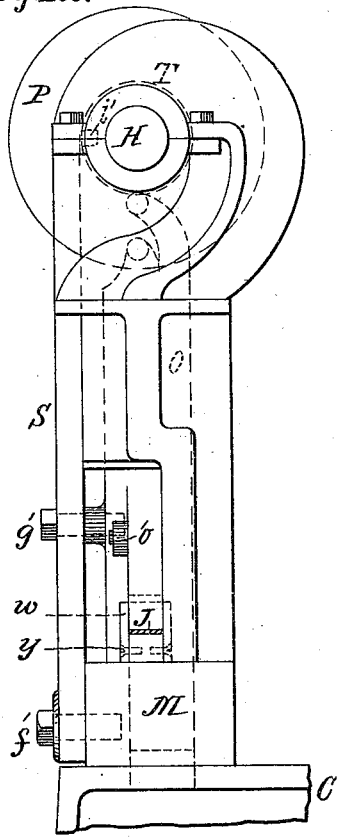
Figure 14:
Figure 15:
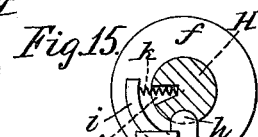
Figure 16:
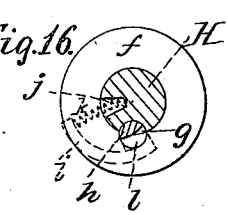
Figure 13:
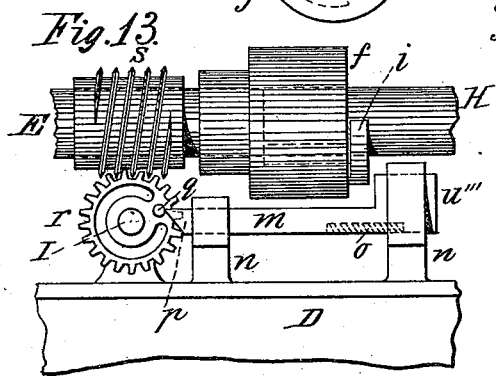
Figure 30:
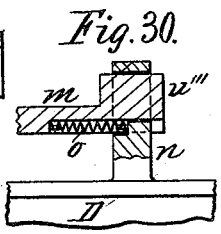
Figures 32, 33:
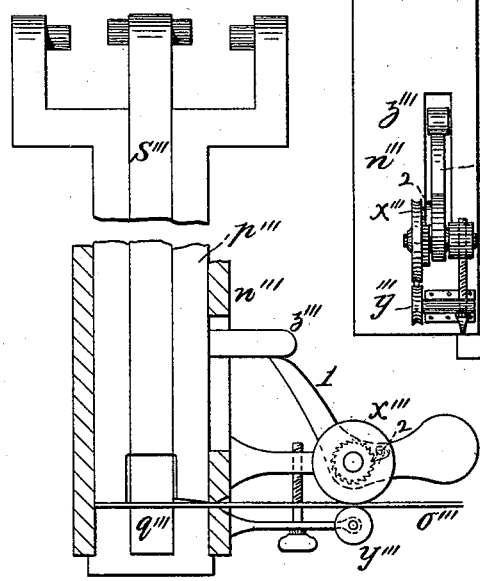
Figure 34:
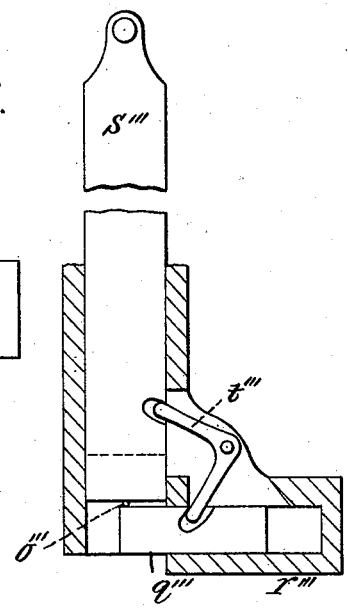
Figures 35, 37:
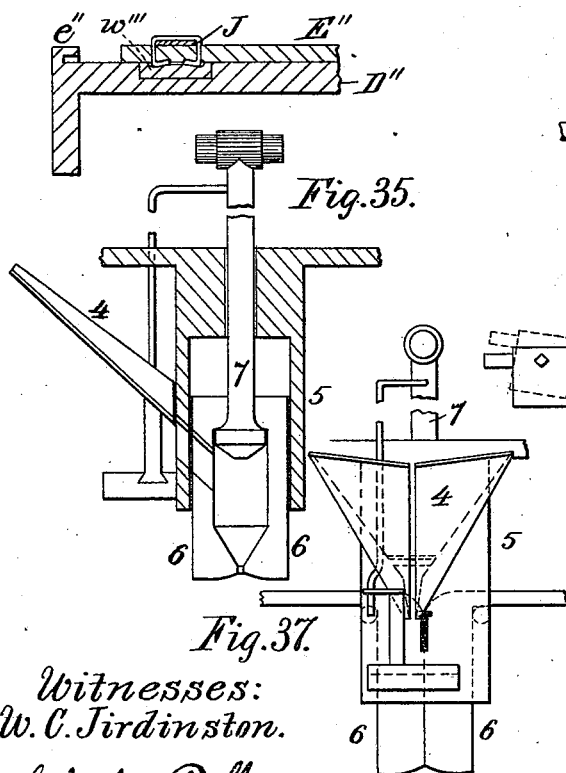
Figure 36:
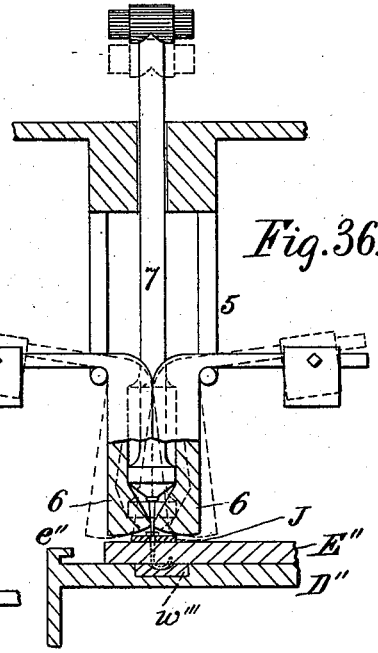

In the accompanying drawings, Figure 1, Sheet 1, is a plan view of a machine embodying my invention. Fig. 2, Sheet 2, is a side elevation of the same. Fig. 3, Sheet 3, is an end elevation of the same. Fig. 4, Sheet 3, is an enlarged detail side elevation of the barrel-former and connected parts. Fig. 5, Sheet 3, is a detail sectional view of a corner of the former at its edge. Fig. 6, Sheet 4, is a side elevation, partly in section, of the hoop-metal supports and the devices for bending, shearing, and looping the hoop metal at one stage of the operation. Fig. 7, Sheet 4, is a similar view of the bending, shearing, and looping devices at a different stage of the operation. Fig. 8, Sheet 4, is a similar view of the same parts at another stage of the operation. Fig. 9, Sheet 4, is a similar view of the same parts at another stage of the operation. Fig. 10, Sheet 4, is a sectional end elevation of one of the hoop-metal reels and its tension device. Figs. 11 and 12, Sheet 5, are enlarged side and end elevations, partly in section, of the corner of the machine at the hoop-feeding end. Fig. 13, Sheet 5, is an enlarged elevation in detail of the clutch mechanism. Figs. 14, 15, and 16, Sheet 5, are details in transverse section of the same, showing the relation of the parts at different stages of the operation. Fig. 30, Sheet 5, is a sectional elevation of one end of the wiper-block and its guide. Figs. 17 and 18, Sheet 6, are enlarged side and end elevations of the punching mechanism. Figs. 19 and 20, Sheet 6, are enlarged side and end elevations of the devices for attaching the hoops to the staves. Fig. 21, Sheet 6, is an enlarged bottom plan view of one of the punches. Fig. 22, Sheet 7, is an enlarged elevation, partly in section, of the clinching-arms and adjacent parts at one stage of the operation. Fig. 23, Sheet 7, is a similar view of the same parts at another stage of the operation. Fig. 24, Sheet 7, is a similar view of the same parts at another stage of the operation. Fig. 25, Sheet 7, is a plan view in section of the clamping and clinching plungers and clinching-arms. Fig. 31, Sheet 7, is an elevation, partly in section, of the completed barrel. Fig. 26, Sheet 8, is a perspective view of the barrel-former and stave-feeder. Fig. 27, Sheet 8, is a plan view of the former at its jointing-slot. Fig. 28, Sheet 8, is an end elevation of the lower part of the machine, representing modifications in the stave-cutting apparatus. Fig. 29, Sheet 8, is an enlarged transverse section in detail of the former at the jointing-slot, showing the cutter and its guides. Fig. 32, Sheet 9, is a side elevation, partly in section, of the staple forming and driving devices. Fig. 33, Sheet 9, is an end elevation of the same, showing the wire feeding and tension devices of Fig. 32. Fig. 34, Sheet 9, is an end elevation, partly in section, of the staple forming and driving devices of Fig. 32. Fig. 35, Sheet 9, is a side elevation, partly in section, of the nail feeding and driving devices. Fig. 36, Sheet 9, is an end elevation, partly in section, of the same. Fig. 37, Sheet 9, is a detail end elevation of the nail-trough and connected devices. Fig. 38, Sheet 1, is an end elevation of the barrel. Fig. 39, Sheet 1, is an enlarged transverse section through adjacent staves, showing the manner of bending down and securing the looped and connected ends of the hoops. Fig. 40, Sheet 1, is a similar view before the looped and connected ends are bent down and secured. Figs. 41 and 42, Sheet 1, are plan views of the hoops of Figs. 39 and 40, respectively. Fig. 43, Sheet 2, is an enlarged sectional detail of one end of the barrel, showing the manner of securing and supporting the head therein.

The same letters and numerals are used to indicate identical parts in all the figures.

The frame-work of the machine is composed in this instance of a bed-plate A, uprights B, cross-sills C, and top horizontal I-beams D, all firmly bolted or united together to form a rigid frame-work.

Suitably journaled in boxes $a$, secured upon the beams D, are horizontal parallel shafts E, in this instance four, and running lengthwise of the machine. Simultaneous and uniform speed and revolution are imparted to the shafts E by a transverse worm-shaft F, carrying worms $b$, meshing with worm-wheels $c$ upon the shafts E, Fig. 3, which worm-shaft is suitably journaled in boxes $d$ and is driven by a pulley G or other suitable means.

In alignment and concentric with each of the shafts E is a shaft H, supported and journaled in suitable boxes $e$ and connected to its coincident shaft E by a clutch-collar $f$, tight upon the shaft E, (see Figs. 2, 13, 14, and 15,) in the following manner: The end of each shaft H within the collar $f$ has a semicircular key-seat $g$, in which is fitted a semi-cylindrical key $h$, whose projecting end is formed into a curved arm $i$, between which and a bore $j$ in the shaft H is confined a spiral spring $k$, whose office is to turn the key in its seat at a given moment, and by means to be presently explained to cause it to partially enter a coincident seat $l$ in the bore of the collar $f$, thereby forming a clutch to lock the shaft E to the shaft H for imparting revolution to the shaft H.

The means for actuating the keys $h$ simultaneously to engage and release the shafts E and H are as follows: Under each collar $f$ is a sliding dog or wiper-block $m$, supported in upright guides $n$ and having at one end an enlarged head $u'''$, adapted to be projected under the path of the superimposed arm $i$ by any suitable spring, as $o$, and having at its other end a beveled nose $p$, arranged to be engaged by a pin or projection $q$ upon a disk $r$, of which there are four secured to a transverse shaft I, suitably journaled under the shafts E adjacent to the collars $f$. One of these disks $r$ is a worm-gear and meshes with a worm $s$ upon its adjacent shaft E. The pitch of the worm is such that the shaft E may have any desired number of revolutions for each single revolution of the shaft I. At each complete revolution of the shaft I the pins $q$ simultaneously engage with the beveled noses of the wiper-blocks $m$ and force them back out of engagement with the arms $i$ previous to or just at the moment the key-seats $g$ and $l$ are coincident, so that the springs $k$ turn the keys $h$ simultaneously to effect the clutch engagement between the shafts E and H. The pins $q$ in passing instantly release the wiper-blocks $m$, which are projected forward by their springs $o$, thereby bringing their enlarged heads $u'''$ in the path of the arms $i$ until, the shafts H having made one complete and simultaneous revolution, the arms $i$ come in contact with and are pressed in by the heads $u'''$ of the wiper-blocks and the keys $h$ are turned back into their seats $g$ to release them from the collars $f$, and so break the clutch engagement. Thus it is seen that for every given number of revolutions of the shafts E the shafts H are given a single and simultaneous revolution.

The above constitute the driving mechanism for actuating the various parts of the machine in the order to be presently explained.

The hoops J for uniting the staves are in this instance four in number and are formed from continuous pieces of hoop metal carried upon reels or spools K, secured to the rear of the frame-work and held from paying out too fast by any suitable tension device or brake L. (See Fig. 10.)

Secured rigidly upon the rear sill C under each shaft H is a combined anvil-block and guide M, having a flat horizontal top and a central recess $t$ with vertical walls. Fitting snugly within the recess of each block M is a vertical reciprocating die-block N, carried by an upwardly-extending arm O, passed through suitable guides and having at its top a pin $u$, Fig. 11, extending into a cam-groove $v$ in the face of a disk P, secured upon the adjacent shaft H.

Embracing the forward sides of the block N are two slides $w$, Figs. 2, 6, 7, 8, 9, and 11, connected by a vertical web $x$, extending transversely across the block at its extreme forward edge and serving as a male die in connection with the block N, as presently explained. These slides are secured to the block by screws $y$, passed through horizontal slots $a'$, and are held forward, so as to bring the forward walls of the block and die $x$ in vertical alignment, by springs $b'$, confined between the ends of the slides and lugs $c'$ upon the blocks N.

Just over each of the blocks M and N is a vertically-reciprocating plunger-die Q, confined in suitable guides in the frame. The upper end of each plunger Q extends between the disk P and a second disk R upon the shaft H and has projecting pins $d'$, entering coincident cam-slots $e'$ in the inner faces of both disks, said slots and pins being of such depth and length, respectively, that the plunger Q, in addition to its vertical reciprocation, may have a horizontal reciprocation imparted to it by an arm S, pivoted at its lower end to the block M, as at $f''$, connected to the plunger Q by a pin $g'$, passed through a vertical slot $h'$, and having at its upper end a pin $i'$, entering a peripheral cam-slot $j'$ in an enlargement or collar T upon the shaft H between the disks P R, as seen in Figs. 1, 2, 11, and 12. The under side of each plunger Q is recessed transversely, as at $k'$, Fig. 7, to receive the male die $x$, and also to contain a follower-block $l'$, which has pins $m'$ on each side projecting through vertical slots $n'$, and which pins are engaged by any suitable springs $o'$ upon the sides of the plunger Q. The depth of the recess $k'$ is sufficient to receive both the follower $l'$ and the die $x$.

Upon the under forward side of each plunger Q is a horizontal clamping-follower U, with vertical slots $p'$, through which are passed attaching and guide screws $q'$. These followers are normally held with their rear vertical sides in alignment with the forward wall of the recess $k'$ by springs $r'$, secured to the plungers Q and bearing against the forward ends of the followers, as shown. The normal position of the parts just described, when at rest, is shown in Fig. 6, and in starting the machine for the first time the strap-iron to form the first hoops J is drawn forward from the spools K by hand and is placed over the blocks N and M, with the forward ends held between any suitable guides, as pins $s'$, Fig. 9, so as to bring them directly over the dies $x$ and under the recesses $k'$. Now, supposing that the shafts H are simultaneously set in motion to give them one complete revolution, as before described, the shape of the cam-slots and the adjustment of the parts are such that the plungers Q will first descend until the followers U rest upon the ends of the hoops J and clamp them to the blocks M, as seen in Fig. 7. The blocks N, with their dies $x$, will then ascend, bending up the hoops and forcing them into the recesses $k'$, as seen in Fig. 11, thereby forming right-angular lower bends and upper loops in the hoops. Just as the dies $x$ and blocks N have finished their upper strokes to form the bends and loops in the hoops the plungers Q are moved backward by the arms S through the action of the cam-slots $j'$ and the hoops are sheared in line with their rear extensions by plates $t'$, as seen in Fig. 8, the followers U remaining stationary for that purpose, while the plungers Q slide back upon them, and the dies $x$, with their slides $w$, move back upon the blocks N against the resistance of their springs $b'$. The moment the shearing is effected vertical clamping-rods V, Figs. 9 and 11, suitably guided and having at their upper ends pins $u'$, confined in cam-slots $v'$ in the forward faces of the disks R, and preferably having rubber blocks $w'$ secured to their lower ends, are brought down upon the hoops in front of the followers U and clamp them to the blocks M. If desired, rubber blocks $x'$ may be recessed in the blocks M just under the lower ends of the clamping-rods V to aid in more securely holding the hoops. As soon as this clamping is effected the plungers Q are given a slightly-upward movement by the disks P and R and a forward horizontal movement by the arms S, and, sliding forward over the followers U, bring the sheared parts of the hoops and the slides $w$ and dies $x$ to the positions they occupied before the shearing began, at which moment the blocks N descend to their normal position of rest and withdraw the dies $x$ from the loops in the hoops, and the plungers Q, progressing still farther forward, carry with them the followers U and bring the looped ends of the hoops over the upright ends, as seen at Fig. 9, at which moment, the sheared ends having cleared each other, the followers $l'$ by the action of their springs $o'$ force the looped ends of the hoops out of the recesses $k'$ and down over and straddling the bent-up portions, as seen in Fig. 6. The clamping-rods V are then raised simultaneously with the plungers Q and their followers U, and the shafts H have at this moment effected one complete revolution and are stopped by the means before described. This operation of bending, shearing, and engaging the looped and bent ends of the hoops occurs at every revolution of the shafts H, as will be readily understood.

Assuming, as before, that the hoops have been introduced for the first time, the sheared-off ends are detached and thrown away and the hoops with their looped ends are drawn forward between guide-pins $y'$, Figs. 2, 17, and 18, upon blocks carried by the sill C of the middle uprights B and under and between pairs of punches $a''$ under each shaft E, secured to vertical slides W, confined in suitable guides X, secured to the frame-work and actuated by adjustable hinged links Y, whose upper boxes $A''$ are confined upon cranks or eccentrics $E''''$ upon the shafts E in such manner that each revolution of the shafts E causes the punches $a''$ to rise and fall simultaneously. The under sides of the punches $a''$ have V-shaped male dies $b''$, (see Fig. 21,) which, acting in connection with correspondingly-shaped female dies $c''$ on the sill C, cut through the hoops to form attaching-points $d''$, (see Figs. 41 and 42,) which in the further operation of the machine, as presently explained, are forced down into the barrel-staves and serve to unite the latter and the hoops together. The punches are made at such distances upon the hoops that two of the attaching-points $d''$ of each hoop are employed for and forced into each stave. On their passage from the bending and shearing devices to the punches the two middle hoops are passed under vertically-adjustable take-up rollers $B''$, arranged out of the line of travel of the outer hoops to give greater length to the inner hoops to accommodate the bilge of the barrel.

Secured to cross-bars $C''$ at each side of the machine between the middle and front uprights B, Figs. 2, 4, and 26, is the barrel-former $D''$, upon which the rectangular staves $E''$, held upon an inclined table $F''$, are forced one by one, are bent to form the bilge of the barrel, have their edges sawed or cut and fitted together to form close joints, and have the hoops secured to them to hold them together in the following manner and by the following means: The barrel-former $D''$ is substantially semi-cylindrical and extends transversely across the machine, with a central vertical slot $z'$ for the passage of the dressing-saw or cutter-head. Its rear lower edge is straight and horizontal, from which point upward to the slot it assumes the bilge shape of the barrel, as seen in Fig. 26. It is preferably removable for the substitution of other formers of different shape, as where more, less, or no bilge is required. Its upper edges have guide-flanges $e''$, to which are fitted the curved feeding-arms $f''$, connected at their lower ends by the cross-bar $g''$, having pins $h''$ uniting it to the lower ends of links $G''$, whose upper ends are pivoted to bell-crank levers $H''$ on each side of the machine, pivoted, as at $i''$, and having at their upper ends pins $j''$, confined in peripheral cam-slots $k''$ in an enlargement or collar $l''$ on each of the outer shafts E.

The horizontal transverse slide-bed $I''$, Figs. 2 and 3, for the saw-arbor frame $J''$, which is dovetailed thereto in the usual or any suitable manner, is hung at each end upon horizontal cam or eccentric shafts $K''$, journaled in lugs or ears $L''$ upon the bed-plate A. These shafts $K''$ have crank-arms $M''$ at one end, from which extend upwardly arms $N''$, whose upper ends are provided with pins confined in coincident cam-slots in the inner faces of two disks $O''$ upon each of the outer shafts E.

The saw-driving shaft $P''$, provided at one end with a driving-pulley $Q''$, is journaled in hangers $R''$, extending downward from the base A, Figs. 2 and 3, and it has upon it a loose sleeve $S''$, to which is attached an upright frame $T''$, in the upper end of which are journaled guide-pulleys $U''$ for the driving-belt $V''$, which passes over them from the pulley $W''$ on the saw-arbor and down around a pulley $X''$ on the driving-shaft $P''$. Two pivoted arms $Y''$ extend from the saw-arbor frame $J''$ to the frame $T''$ between the pulleys $U''$. The saw-arbor carries a saw $A'''$, which extends up and nearly fills the width of the slot $z'$ in the former $D''$.

$B'''$ is an arm pivoted at its lower end to a projection $C'''$ from the sleeve $S''$ and at its upper end to an arm $D'''$, suitably guided in the frame and provided at its upper end with pins confined in coincident cam-slots in the inner faces of two disks $E'''$ upon the outer shaft E in such manner that each revolution of said shaft will partially oscillate the sleeve $S''$ and vibrate the frame $T''$ to cause the saw to travel through the medium of the arms $Y''$ through the slot in the former $D''$, entirely across said former, and back again, as will be readily understood. The cam-slots in the disks $O''$ are so shaped that in the backward cutting travel of the saw across the former $D''$ the bed $I''$ will be raised through the medium of the eccentric-shafts $K''$ and arms $N''$ to cause the saw to follow the bilge of the former and cut the edge of the stave projecting over the slot through its thickness, and will be lowered out of cutting contact at the end of its backward travel and during its forward travel.

The operation of feeding the staves upon the former is accomplished by the arms $f''$ through the medium of the bell-cranks $H''$ and links $G''$, and the cam-slots in the collars $l''$ are so shaped that at the beginning of the revolution of the shafts E the lower ends of the arms $f''$ are below the lower stave upon the table $F''$, and the first movement is to push said stave from under the others and up upon the former $D''$. At the beginning of its upward travel the stave is caught under spring guide-arms $F'''$, Figs. 4 and 26, whose upper ends are secured to the frame-work on each side and extend forward and down just within the path of the outer hoops and then curve back above and parallel to the former $D''$ sufficiently to permit the passage of the ends of the stave under them, and whose opposite rearwardly and forwardly bent-up ends are connected to adjusting-screws $G'''$ for regulating the pressure of the spring guide-arms upon the ends of the staves, and as it (the stave) is carried on up it is bent by these springs to conform to the bilge of the former and is brought with its bent forward edge overlapping the slot, as seen by the dotted lines, Fig. 27, whereupon the action of the feeding-arms is stopped, while the saw travels through the slot, as before described, and as it comes back cuts off the projecting edge of the stave, if it be the first one, or both staves after the first. As will be seen from Fig. 27, the staves abut together at their ends, while, owing to the bilge of the former $D''$, they are some distance apart at their center, and the saw will therefore cut away more of the edges of the staves at their ends than at their center, thereby causing their edges when brought together to fit snugly and form a perfect joint the entire length of the staves. As soon as the saw has completed its cutting the stave is further slightly advanced by the feeding-arms sufficiently to close the joint between the two staves, and then the fastening of the hoops to the staves thus jointed is accomplished in the following manner and by the following means:

Just over each hoop as it crosses the slot in the former $D''$ and under each shaft E, Figs. 2, 19, 20, 22, 23, 24, and 25, is a clamping-plunger, in this instance composed of two bars $H'''$, supported in suitable vertical guides and having their upper forked ends $m''$ provided with pins $n''$, confined in coincident cam-slots $o''$ upon the outer faces of two disks $I'''$ upon the shafts E. Between the sides of the plunger $H'''$ is a clinching-plunger $J'''$, confined in a vertical guide and having its upper end provided with pins $p''$, confined in coincident cam-slots $q''$ in the inner faces of the two disks $I'''$. The lower end of the plunger $J'''$ has projecting ears $r''$ on each side, to which are pivoted links $K'''$, whose lower ends are pivoted to bell-crank clincher-arms $L'''$, pivoted at $v'''$ to and between the sides of the plunger $H'''$. The plungers $H'''$ have a transverse recess $s''$, Fig. 25, at their lower ends to receive the engaged, looped, and bent ends $t''$ of the hoops as they come under the plungers, (see Figs. 22, 23, 24, and 25,) and the clinching-jaws are curved, as shown, and made to conform on their lower faces to the shape of the attaching-points $d''$ of the hoops.

At the beginning of the operation the hoops are drawn forward by hand from the punches and are placed in proper position (see Fig. 24) over the first stave which has been elevated and sawed. The cam-slots in the disks $I'''$ are so shaped that the plungers $H'''$ are first lowered (see Fig. 19) to clamp the hoops to the stave, and then the plungers $J'''$ are lowered, thereby vibrating the clincher-arms $L'''$ (see Fig. 23) and causing their clinching-points to force the attaching-points $d''$ of the hoops into the wood to fasten the hoops to the stave. After the first stave has been sawed and the hoops fastened to it the feeding of the hoops is automatic and is accomplished by the forcing forward of the attached staves, which draw the hoops with them by the feeding of each new stave. When the first and second staves and all others after them are sawed and joined, both clinching-arms come into play to force two attaching-points $d''$ of each hoop into both staves adjacent to the slot in the former $D''$, and in such manner, (see Fig. 23,) owing to the curve of the clinching-arms, that the joints of the staves are forced tightly together by the forcing in of the attaching-points $d''$. The inner hoops are guided over suitable adjustable take-up rollers, as $u''\ v''$, Fig. 2, between the punches and former $D''$ to aid in giving them the proper length to suit the bilge of the barrel. When sufficient staves have been united to form the barrel, they are disconnected from the other staves at the point where the hoops are looped and temporarily jointed, and are removed to be bent into barrel shape around any suitable former, and the looped and bent ends of the hoops are reunited and bent down, as seen in Fig. 39, and are held by any suitable fastening device, as a staple 8.

To attach the heads to the barrels after the hoops have been secured at their ends, I employ four or more pieces of strap-iron $M'''$, Figs. 31, 38, and 43, which are secured in any suitable manner to the inner sides of four equidistant staves in the barrel, preferably after the connected staves are removed from the machine. These straps $M'''$ run lengthwise of the staves and project some distance from their ends, and they are bent to form ledges $a'''$, upon which the inserted heads $N'''$ rest, as shown. After the insertion of the heads rings or wooden hoops $O'''$ are placed upon the heads and snugly fit the inside of the barrel, and the projecting ends of the straps $M'''$ are bent down over them and secured to the heads, as seen at $b'''$, Figs. 31 and 43. If desired, the rings $O'''$ may be omitted and the projecting ends of the straps may be bent down flat upon the heads to secure them in place.

Among the modifications that might be made in the construction of the machine I would mention the following:

Instead of the saw for cutting off the edges of the staves at the slot in the former $D''$, I could employ the cutter-head $c'''$, Figs. 28 and 29, which would be carried within the slot $z'$ in the former $D''$ upon a spindle $d'''$, journaled in a block or cross-head $e'''$, hung upon rollers $f'''$, confined in coincident endless slots $g'''$ upon the under side of the former $D''$ and extending across the same, the upper part of which slot would be parallel with the bilge of the former $D''$. The cross-head $e'''$ would be connected by an arm $h'''$, pivoted to the upper end of the vibrating frame $T''$, but rigidly connected to the cross-head. The lower end of the spindle $d'''$ would be provided with a grooved pulley $i'''$, from which a driving-cord $j'''$ extends over two loose grooved pulleys $k'''$ side by side upon a spindle $l'''$ in the upper end of the frame $T''$, and thence down around the pulley $X''$, suitably grooved for that purpose. Within the slots $g'''$ at one end are gravitating dogs $m'''$, which permit the passage under them of the rollers $f'''$ at the end of the stroke of the vibrating frame $T''$ and guide them up into the upper part of the slots to lift the cutter-head into cutting contact with the staves on the return-stroke of the vibrating frame, as will be readily understood.

Again, instead of punching the hoops to form the retaining-points $d''$, the devices shown in Figs. 32, 33, and 34 might be employed for forming staples and driving said staples across the hoops into the staves to secure the hoops to the staves. In said figures $n'''$ is a vertical guide-socket, into which the wire $o'''$, for forming the staples, is fed, and contains a shearing and bending plunger $p'''$, acting in connection with an anvil-block $q'''$, contained in a lateral guide-housing $r'''$, forming part of or attached to the guide $n'''$. Between the two parts of the bending-plunger is a driving-plunger $s'''$, connected by a pivoted bell-crank $t'''$ to the anvil $q'''$ in such manner that as soon as the wire has been sheared and bent to form the staple the driving-plunger in commencing its descent to drive the staple draws the anvil $q'''$ back out of the way, whereupon the staple is driven across the hoop into the stave and through the same, if desired, and may have its lower ends clinched by anvil-blocks $w'''$ in the former $D''$.

Any suitable devices for feeding in the wire $o'''$ may be employed, such as the rollers $x'''\ y'''$, held in engagement with the wire by spring-tension and operated only upon the upstroke of the plunger $p'''$ through the medium of the arm $z'''$ and gravitating dog 1, carrying a small dog 2, engaging with a ratchet 3 upon the feed-wheel $x'''$.

Again, instead of the retaining-points $d''$ or the staples for uniting the hoops to the staves, ordinary tacks or nails might be used, as shown in Figs. 35, 36, and 37. In this latter case the hoops would simply have small holes punched through them by the punching mechanism, and the nails would be fed by a vibrating trough 4 into a guide-socket 5, containing pivoted expansible jaws 6, between which a reciprocating plunger 7 would play to drive the fed-in nails through the holes in the hoops into the staves, as will be readily understood.

The plunger for the staples and nail mechanism would be actuated from the shafts E by the means described for the clinching and clamping plungers.

It will be understood that my invention is not limited to the organization of the entire machine which I have shown and described, and in which the whole operation of feeding in the staves, bending and jointing them, forming the hoops from continuous pieces of hoop-iron, and looping, connecting, and punching the same and attaching them to the staves is automatically performed in one connected machine, for many of the various novel and useful sub-combinations of elements hereinafter claimed may be independently employed in machines of different construction and arrangement. For instance, the devices for attaching the hoops to the staves may be used independently of the cutting devices for jointing the staves, as where the latter are jointed before being fed into the machine, while both these sets of devices may be used without the devices for cutting the hoops from continuous pieces of metal and bending, looping, connecting, and punching the same, as where previously-formed hoops are fed into the machine by hand or otherwise.

Again, while I have shown and described the barrel-former as of a peculiar bilge shape in order to give such shape to the barrel, I do not wish to be understood as limiting myself to any particular shape of the former, for it may be changed without departing from my invention, and under some circumstances might even be a simple table or anvil-block to support the staves as they are passed beneath the devices for attaching the hoops to them, and where the traveling cutter is employed to joint the staves as they are passed over the former, if the latter is flat or has a straight longitudinal surface, the mechanism for raising and lowering the cutter to follow the line of a bilge-shaped former would of course be dispensed with.

Again, while I have shown a series of take-up rollers or wheels B'' engaging the two middle hoops of the series between the cutting devices and the former to make the path of travel of said middle hoops from the cutting devices to the former longer than that of the outside hoops, for the purpose of giving greater length to said middle hoops to accommodate the bilge of the barrel, this result may be accomplished in a variety of ways, either with or without the use of special devices for that purpose; also, the punching devices, which are needed in heavy work, may, if desired, be dipensed with where the work is light and very thin hoop-iron is used, in which event the devices for attaching the hoops to the staves on the former can themselves be made to do the punching.

It will also be understood that the details of construction of the machine may be largely varied without departing from my invention.

The construction of the completed barrel in the manner described also involves a new process of manufacture independent of the particular machine I have organized for carrying out that process, and such process forms the subject-matter of a separate application filed by me September 5, 1889, and bearing Serial No. 323,068. The completed barrel itself is believed to be new as an article of manufacture and forms the subject-matter of another application filed by me September 5, 1889, and bearing Serial No. 323,069.

Having thus fully described my invention, I claim—

1. In a barrel-making machine, the combination of a stationary former over which the staves and hoops are fed and superimposed plungers carrying devices for attaching the hoops to the staves as they are passed over said former, substantially as described.

2. In a barrel-making machine, the combination of a stationary former over which the staves and hoops are fed, superimposed plungers carrying devices for attaching the hoops to the staves as they are passed over said former, and cams for actuating said plungers, substantially as described.

3. In a barrel-making machine, the combination of a stationary former over which the staves and hoops are fed, vertically-reciprocating plungers carrying devices for attaching the hoops to the staves as they are passed over said former, superimposed revolving shafts, and cams carried by said shafts and actuating said plungers, substantially as described.

4. In a barrel-making machine, the combination of a former over which the staves and hoops are fed, a series of superimposed plungers, one for each hoop, and carrying devices for attaching the hoops to the staves as they are passed over said former, and a series of revolving shafts, one for each plunger, and each carrying a cam for actuating its corresponding plunger, substantially as described.

5. In a barrel-making machine, the combination of a former over which the staves and hoops are fed, a series of superimposed plungers, one for each hoop, and carrying devices for attaching the hoops to the staves as they are passed over said former, a single driving worm-shaft, a series of shafts, one for each plunger, and each carrrying a worm-wheel engaging with the worm-shaft, and a series of cams, one on each of the worm-driven shafts for actuating said plungers, substantially as described.

6. In a barrel-making machine, the combination of a former over which the hoops and staves are fed and devices for forcing portions of the hoop metal into the staves as they are passed over said former, substantially as and for the purpose described.

7. In a barrel-making machine, the combination of a former over which the staves and hoops are fed and a plunger carrying devices for forcing portions of the hoop metal into the staves as they are passed over said former, substantially as described.

8. In a barrel-making machine, the combination of a former over which the staves and hoops are fed, a plunger carrying devices for forcing portions of the hoop metal into the staves as they are passed over said former, and a cam for actuating said plunger, substantially as and for the purpose described.

9. In a barrel-making machine, the combination of a former over which the staves and hoops are fed, clinching-points for forcing portions of the hoop metal into the staves as they are passed over said former, and means for actuating said clinching-points, substantially as and for the purpose described.

10. In a barrel-making machine, the combination of a former over which the staves and hoops are fed, and a plunger carrying clinching-arms for forcing points of the hoop metal into the staves as they are passed over said former, substantially as described.

11. In a barrel-making machine, the combination of a former over which the staves and hoops are fed, a plunger carrying clinching-arms for forcing points of the hoop-metal into the staves as they are passed over said former, and a cam for actuating said plunger and clinching-points, substantially as described.

12. In a barrel-making machine, the combination of a former over which the staves and hoops are fed, vertically-reciprocating plungers carrying clinching-arms for forcing portions of the hoop metal into the staves as they are passed over said former, superimposed revolving shafts, and cams carried by said shafts and actuating said plungers, substantially as and for the purpose described.

13. In a barrel-making machine, the combination of a former over which the staves and hoops are fed, a series of superimposed plungers, one for each hoop, and carrying clinching-arms for forcing portions of the hoop metal into the staves as they are passed over said former, and a series of revolving shafts, one for each plunger, and each carrying a cam for actuating the corresponding plunger, substantially as and for the purpose described.

14. In a barrel-making machine, the combination of a former over which the staves and hoops are fed, a series of superimposed plungers, one for each hoop, and carrying clinching-arms for forcing points of the hoop metal into the staves as they are passed over said former, a single driving worm-shaft, a series of shafts, one for each plunger, and each carrying a worm-wheel engaging with the worm-shaft, and a series of cams on said worm-driven shafts for actuating said plungers, substantially as described.

15. In a barrel-making machine, the combination of a former over which the staves and hoops are fed, a pair of superimposed pivoted arms provided with clinching-points, and means for actuating said arms and clinching-points, substantially as and for the purpose described.

16. In a barrel-making machine, the combination of a former over which the staves and hoops are fed, a pair of superimposed pivoted arms provided with clinching-points, and a clinching-plunger connected to said arms for actuating the clinching-points, substantially as and for the purpose described.

17. In a barrel-making machine, the combination of a former over which the staves and hoops are fed, a pair of superimposed pivoted arms provided with clinching-points, a clinching-plunger connected to said arms, and a cam for actuating said plunger, substantially as and for the purpose described.

18. In a barrel-making machine, the combination of a former over which the staves and hoops are fed, a superimposed clamping-plunger and a clinching-plunger, and a pair of clinching-points carried by the clamping-plunger and actuated by the clinching-plunger, substantially as and for the purpose described.

19. In a barrel-making machine, the combination of a former over which the staves and hoops are fed, a superimposed clamping-plunger and a clinching-plunger, and a pair of arms pivoted to the clamping-plunger, provided with clinching-points, and actuated by the clinching-plunger, substantially as and for the purpose described.

20. In a barrel-making machine, the combination of a former over which the staves and hoops are fed, a superimposed clamping-plunger and a clinching-plunger, a pair of clinching-points carried by the clamping-plunger and actuated by the clinching-plunger, and cams for actuating both of said plungers, substantially as and for the purpose described.

21. In a barrel-making machine, the combination of a former over which the staves and hoops are fed, a superimposed clamping-plunger and a clinching-plunger, a pair of arms pivoted to the clamping-plunger, provided with clinching-points, and connected to the clinching-plunger, and cams for actuating both plungers, substantially as and for the purpose described.

22. In a barrel-making machine, the combination of a former over which the staves and hoops are fed, a superimposed clamping-plunger and a clinching-plunger, a pair of bell-crank arms pivoted to the clamping-plunger and provided with clinching-points, links connecting said arms to the clinching-plunger, a revolving shaft above the plungers, and a disk secured on said shaft and provided on each side with a cam-groove, one of which grooves engages a pin on the upper end of the clamping-plunger and the other a pin on the upper end of the clinching-plunger, substantially as and for the purpose described.

23. In a barrel-making machine, the combination of a former over which the staves and hoops are fed, a superimposed clamping-plunger, and a clinching-plunger fitting within the clamping-plunger, a pair of bell-crank arms pivoted in the lower slotted end of the clamping-plunger and provided with clinching-points, links connecting said arms to the clinching-plunger, a revolving shaft above the plunger, and two disks secured on said shaft and each provided with two cam-grooves, one on each of its sides, with the two inner grooves of which pins on the upper end of one of the plungers engage and with the two outer grooves of which pins on the forked upper end of the other plunger engage, substantially as and for the purpose described.

24. In a barrel-making machine, the combination of a stationary former over which both the staves and strips of hoop metal are fed in the same direction and feeding devices for forcing the staves and strips of hoop metal over said former, substantially as and for the purpose described.

25. In a barrel-making machine, the combination of a stationary former over which both the staves and strips of hoop metal are fed in the same direction, superimposed guides for holding the staves to the former, and feeding devices for forcing the staves and strips of hoop metal over said former, substantially as and for the purpose described.

26. In a barrel-making machine, the combination of a stationary former over which the staves and hoops are fed, superimposed guides for holding the staves to the former, and attaching devices for securing the hoops to the staves while they are being fed over said former, substantially as and for the purpose described.

27. In a barrel-making machine, the combination of a stationary former over which the staves and hoops are fed, superimposed spring-guides for clamping the staves to the former, and attaching devices for securing the hoops to the staves while they are being fed over said former, substantially as and for the purpose described.

28. In a barrel-making machine, the combination of a stationary former over which the staves and hoops are fed, spring-guides for holding the staves to the former, and superimposed plungers carrying devices for attaching the hoops to the staves as they are passed over said former, substantially as and for the purpose described.

29. In a barrel-making machine, the combination of a former over which the staves and hoops are fed, superimposed guides for holding the staves to the former, and devices for forcing portions of the hoop metal into the staves as they are passed over said former, substantially as and for the purpose described.

30. In a barrel-making machine, the combination of a former over which the staves and hoops are fed, guides for holding the staves to the former, and superimposed clinching-points with means for actuating the same to force portions of the hoop-metal into the staves as they are passed over said former, substantially as and for the purpose described.

31. In a barrel-making machine, the combination of a former over which the staves and hoops are fed, spring-guides for holding the staves to the former, and superimposed plungers carrying clinching-points for forcing portions of the hoop metal into the staves as they are passed over said former, substantially as and for the purpose described.

32. In a barrel-making machine, the combination of a stationary former over which the staves and hoops are fed, devices for feeding the staves over the former, and attaching devices for securing the hoops to the staves while they are being fed over said former, substantially as and for the purpose described.

33. In a barrel-making machine, the combination of the former over which the staves and hoops are fed, feeding-arms with means for actuating the same to feed the staves over the former, and attaching devices for securing the hoops to the staves while they are being fed over said former, substantially as and for the purpose described.

34. In a barrel-making machine, the combination of a stationary former over which the staves and hoops are fed, devices for feeding the staves over the former, and superimposed plungers carrying devices for attaching the hoops to the staves as they are passed over said former, substantially as and for the purpose described.

35. In a barrel-making machine, the combination of a former over which the staves and hoops are fed, devices for feeding the staves over the former, and devices for forcing portions of the hoop metal into the staves as they are passed over the former, substantially as and for the purpose described.

36. In a barrel-making machine, the combination of a former over which the staves and hoops are fed, devices for feeding the staves over the former, and superimposed clinching-points with means for actuating the same to force portions of the hoop metal into the staves as they are passed over said former, substantially as and for the purpose described.

37. In a barrel-making machine, the combination of a former over which the hoops and staves are fed, curved feeding-arms arranged in guides on said former, a cam, and connecting mechanism between the same and the feeding-arms for actuating the latter, substantially as and for the purpose described.

38. In a barrel-making machine, the combination of a former over which the staves and hoops are fed, curved feeding-arms arranged in guides on said former, a revolving shaft having a peripheral cam-slot, pivoted bell-crank arms engaging said slot, and links connecting said bell-crank arms with the feeding-arms, substantially as and for the purpose described.

39. In a barrel-making machine, the combination of a former over which the staves and hoops are fed, superimposed curved spring-guides for clamping the staves to the former, set-screws engaging said spring-guides for adjusting the same, feeding-arms arranged in guides upon the former, a shaft journaled above said former and having a collar provided with a peripheral cam-slot, two pivoted bell-crank arms engaging said slot, and links connecting the bell-crank arms and feeding-arms, substantially as and for the purpose described.

40. In a barrel-making machine, the combination of a former over which the staves are fed in a continuous series, devices for holding the staves to the surface of the former as they are passed over the same, and a traveling cutter moving lengthwise of said former to joint the staves as they are held thereon, substantially as and for the purpose described.

41. In a barrel-making machine, the combination of a former over which the staves are fed, superimposed guides for holding the staves to the former as they are passed over the same, and a traveling cutter moving lengthwise of said former to joint the staves while they are held thereon, substantially as and for the purpose described.

42. In a barrel-making machine, the combination of a former over which the staves are fed, spring-guides for holding the staves to the former as they are passed over the same, and a movable cutter for jointing the staves as they are held on the former, substantially as and for the purpose described.

43. In a barrel-making machine, the combination of a former over which the staves are fed, devices for feeding the staves over the same, and a movable cutter for jointing the staves as they are passed over the former, substantially as and for the purpose described.

44. In a barrel-making machine, the combination of a former over which the staves are fed, feeding-arms arranged in guides, with means for actuating the same to feed the staves over the former, and a movable cutter for jointing the staves as they are passed over the former, substantially as and for the purpose described.

45. In a barrel-making machine, the combination of a former over which the staves are fed, spring-guides for holding the staves to the former as they are passed over the same, and a traveling cutter moving lengthwise of said former to joint the staves as they are held thereon, substantially as and for the purpose described.

46. In a barrel-making machine, the combination of a former over which the staves are fed, devices for feeding the staves over the same, and a traveling cutter moving lengthwise of said former to joint the staves as they are passed over the former, substantially as and for the purpose described.

47. In a barrel-making machine, the combination of a former, devices for feeding the staves over said former, devices for holding the staves to the former, and a cutter for jointing the staves as they are passed over the former, substantially as and for the purpose described.

48. In a barrel-making machine, the combination of a former, devices for feeding the staves over said former, devices for holding the staves to the former, and a traveling cutter moving lengthwise of said former to joint the staves while they are held thereon, substantially as and for the purpose described.

49. In a barrel-making machine, the combination of a former over which the staves are fed, devices for feeding the staves over said former, superimposed guides for holding the staves to the former, and a traveling cutter moving along said former to joint the staves as they are held thereon, substantially as and for the purpose described.

50. In a barrel-making machine, the combination of a former over which the staves are fed, superimposed spring-guides for holding the staves to the former, feeding devices for feeding the staves over the former and beneath the spring-guides, and a traveling cutter moving along said former to joint the staves as they are held thereon, substantially as and for the purpose described.

51. In a barrel-making machine, the combination of a slotted former over which the staves are fed and a cutter moving through the slot to joint the staves as they are held with their edges over the slot, substantially as and for the purpose described.

52. In a barrel-making machine, the combination of a slotted former over which the staves are fed, devices for holding the staves to the former, and a traveling cutter moving through the slot in the former to joint the staves as they are held with their edges over said slot, substantially as and for the purpose described.

53. In a barrel-making machine, the combination of a former having a slot, devices for feeding the staves over said former, clamping devices for holding the staves to the former, and a traveling cutter moving lengthwise through said slot to joint the staves as they are held with their edges over said slot, substantially as and for the purpose described.

54. In a barrel-making machine, the combination of a former having a slot, superimposed spring-guides for clamping the staves to the former, feeding devices for forcing the staves over said former and beneath the spring-guides, and a traveling cutter moving lengthwise through the slot in the former to joint the staves as they are held with their edges over said slot, substantially as and for the purpose described.

55. In a barrel-making machine, the combination of a former having a slot, superimposed spring-guides for clamping the staves to the former, curved feeding-arms arranged in guides on the former for forcing the staves over the same and beneath the spring-guides, mechanism for operating the feeding-arms, and a cutter traveling lengthwise through the slot in the former to joint the staves as they are held with their edges over said slot, substantially as and for the purpose described.

56. In a barrel-making machine, the combination of a former having a slot, superimposed spring-guides for clamping the staves to the former, curved feeding-arms arranged in guides on the former for forcing the staves over the same and beneath the spring-guides, a shaft journaled above the former and provided with a peripheral cam-slot, two pivoted bell-crank arms engaging said slot, links connecting said bell-crank arms with the feeding-arms, and a cutter traveling lengthwise through the slot to joint the staves as they are held with their edges over said slot, substantially as and for the purpose described.

57. In a barrel-making machine, the combination of a slotted former over which the staves are fed, devices for holding the staves to the former, and a traveling saw moving lengthwise through the slot to joint the staves as they are held with their edges over said slot, substantially as and for the purpose described.

58. In a barrel-making machine, the combination of a slotted former over which the staves are fed, a traveling saw moving lengthwise through the slot, a cam, and connecting mechanism between said cam and traveling saw for causing the travel of the latter along the slot, substantially as and for the purpose described.

59. In a barrel-making machine, the combination of a slotted former over which the staves are fed, a traveling saw moving lengthwise through the slot, a swinging frame connected to said saw, and a cam connected to and actuating said frame, substantially as and for the purpose described.

60. In a barrel-making machine, the combination of a slotted former over which the staves are fed, a saw-arbor frame traveling on a slide-bed lengthwise of the former and beneath the same, a saw journaled in said arbor-frame and having its cutting-periphery extending through the slot in the former, a swinging frame, a link connecting the same to the saw-arbor frame, a cam, and an arm engaging said cam and connected to said swinging frame, substantially as and for the purpose described.

61. In a barrel-making machine, the combination of a slotted former over which the staves are fed, a saw-arbor frame traveling on a slide-bed lengthwise of the former and beneath the same, a saw journaled in said arbor-frame and having its cutting-periphery extending through the slot in the former, a driving-shaft, a pulley tight upon said shaft, a sleeve loose upon said shaft, a swinging frame carried by said sleeve and provided with the two idler-pulleys, a driving-belt passing around the pulley on the driving-shaft, the idler-pulleys, and a driving-pulley on the saw-arbor, a cam, and an arm engaging the same and connected to the sleeve on the driving-shaft, substantially as and for the purpose described.

62. In a barrel-making machine, the combination of a former having a bilge-shaped central portion and straight end portions over which the staves are fed and superimposed spring guide-arms for holding the staves to the former and bending them to conform to the shape thereof, substantially as and for the purpose described.

63. In a barrel-making machine, the combination of a former having a bilge-shaped central portion and straight end portions, curved feeding-arms arranged in guides on said former and means for actuating them to feed the staves over the former, and superimposed guides for holding the staves to the former and bending them to conform to the shape thereof, substantially as and for the purpose described.

64. In a barrel-making machine, the combination of a former having a bilge-shaped central portion and straight end portions over which the staves and hoops are fed and bent to conform to the shape thereof and attaching devices for securing the hoops to the staves, substantially as and for the purpose described.

65. In a barrel-making machine, the combination of a former having a bilge-shaped central portion and straight end portions over which the staves and hoops are fed and bent to conform to the shape thereof and superimposed plungers carrying devices for forcing portions of the hoop metal into the staves to attach the hoops thereto, substantially as and for the purpose described.

66. In a barrel-making machine, the combination of a former having a bilge-shaped central portion and straight end portions over which the staves and hoops are fed and bent to conform to the shape thereof, and superimposed clinching-points, with means for actuating the same to force portions of the hoop metal into the staves, substantially as and for the purpose described.

67. In a barrel-making machine, the combination of a former having a bilge-shaped central portion over which the staves are fed, devices for holding the staves to the former and bending them to conform to the shape thereof, and attaching devices for securing the hoops to the staves on the former while they are held bent to the shape thereof, substantially as and for the purpose described.

68. In a barrel-making machine, the combination of a former having a bilge-shaped central portion, devices for feeding the staves over said former, spring-guides for holding the staves to the former and bending them to conform to the shape thereof, and superimposed plungers carrying devices for forcing portions of the hoop metal into the staves to attach them to the hoops while they are held bent to the shape of the former, substantially as and for the purpose described.

69. In a barrel-making machine, the combination of a former having a bilge-shaped central portion, devices for feeding the staves over the former, clamping devices for holding the staves to the former and bending them to conform to the shape thereof, and superimposed plungers carrying clinching-arms for forcing points of the hoop metal into the staves to attach them to the hoops while they are held bent to the shape of the former, substantially as and for the purpose described.

70. In a barrel-making machine, the combination of a former having a bilge-shaped central portion over which the staves are fed in a continuous series, and a traveling cutter moving lengthwise of said former to joint the staves as they are held thereon, substantially as and for the purpose described.

71. In a barrel-making machine, the combination of a former having a bilge-shaped central portion over which the staves are fed in a continuous series and bent to conform to the shape thereof, devices for holding the staves to the former, and a traveling cutter moving lengthwise of the former to joint the staves as they are held thereon, substantially as and for the purpose described.

72. In a barrel-making machine, the combination of a former having a bilge-shaped central portion, devices for feeding the staves over said former and bending them to conform to the shape thereof, and a traveling cutter moving lengthwise of the former to joint the staves as they are held thereon, substantially as and for the purpose described.

73. In a barrel-making machine, the combination of a former having a bilge-shaped central portion over which the staves are fed, devices for clamping the staves to the former and bending them to conform to the shape thereof, feeding devices for forcing the staves over the former and beneath the clamping devices, and a traveling cutter moving lengthwise of the former to joint the staves while they are held thereon, substantially as and for the purpose described.

74. In a barrel-making machine, the combination of a slotted former having a bilge-shaped central portion, over which the staves are fed, superimposed spring-guides for holding the staves to the former and bending them to conform to the shape thereof, feeding devices for forcing the staves over the former and beneath said spring-guides, and a traveling cutter moving lengthwise through the slot in the former to joint the staves while they are held to the former, substantially as and for the purpose described.

75. In a barrel-making machine, the combination of a slotted former having a bilge-shaped central portion over which the staves are fed, superimposed spring-guides for holding the staves to the former and bending them to conform to the shape thereof, curved feeding-arms arranged in guides on said former for forcing the staves over the former and beneath the spring-guides, means for actuating said feeding-arms, and a traveling cutter moving lengthwise through the slot in the former to joint the staves while they are held to the former, substantially as and for the purpose described.

76. In a barrel-making machine, the combination of a slotted former having a bilge-shaped central portion over which the staves are fed and bent to conform to the shape thereof and a traveling cutter moving lengthwise through the slot in a line substantially parallel with the upper edges thereof, substantially as and for the purpose described.

77. In a barrel-making machine, the combination of a slotted former having a bilge-shaped central portion over which the staves are fed and bent to conform to the shape thereof, a traveling cutter moving lengthwise through the slot, and mechanism for raising and lowering said cutter on its passage along said slot to cause it to follow the bilge of the former, substantially as and for the purpose described.

78. In a barrel-making machine, the combination of a slotted former having a bilge-shaped central portion over which the staves are fed and bent to conform to the shape thereof, a traveling saw moving lengthwise through the slot, an arbor-frame carrying said saw, a slide-bed upon which said arbor-frame travels, and mechanism for raising and lowering said slide-bed during the passage of the saw through the slot in the former, substantially as and for the purpose described.

79. In a barrel-making machine, the combination of a slotted former having a bilge-shaped central portion over which the staves are fed and bent to conform to the shape thereof, a traveling saw moving lengthwise through the slot, an arbor-frame for said saw, a slide-bed upon which said arbor-frame travels, and cam-supports for said slide-bed, with means for actuating the same to raise and lower the slide-bed, substantially as and for the purpose described.

80. In a barrel-making machine, the combination of a slotted former having a bilge-shaped central portion over which the staves are fed and bent to conform to the shape thereof, a traveling saw moving lengthwise through the slot, an arbor-frame for said saw, a slide-bed carrying said arbor-frame and hung upon horizontal eccentric-shafts, crank-arms on said shafts, and cams for actuating said crank-arms to oscillate the eccentric-shafts to raise and lower the slide-bed, substantially as and for the purpose described.

81. In a barrel-making machine in which the staves are jointed and the hoops secured to the staves, the combination of a cutter for jointing the staves and attaching devices for securing the hoops to the staves, substantially as and for the purpose described.

82. In a barrel-making machine, the combination of a former over which the staves and hoops are fed, a cutter for jointing the staves, and attaching devices for securing the hoops to the staves, substantially as and for the purpose described.

83. In a barrel-making machine, the combination of a former over which the staves and hoops are fed, devices for feeding the staves over the former, a cutter for jointing the staves, and attaching devices for securing the hoops to the staves, substantially as and for the purpose described.

84. In a barrel-making machine, the combination of a former over which the staves and hoops are fed, superimposed guides for holding the staves to the former, feeding devices for forcing the staves over the former and beneath the guides, a cutter for jointing the staves, and attaching devices for securing the hoops to the staves, substantially as and for the purpose described.

85. In a barrel-making machine, the combination of a former over which the staves and hoops are fed, a cutter for jointing the staves, and devices for forcing portions of the hoop metal into the staves to secure the hoops to the staves, substantially as and for the purpose described.

86. In a barrel-making-machine, the combination of a former over which the staves and hoops are fed, guides for holding the staves to the former, feeding devices for forcing the staves over the former, and beneath said guides, a cutter for jointing the staves, and devices for forcing portions of the hoop metal into the staves to secure the hoops to the staves, substantially as and for the purpose described.

87. In a barrel-making machine, the combination of a former over which the staves and hoops are fed, a traveling cutter moving lengthwise of said former to joint the staves as they are held thereon, and attaching devices for securing the hoops to the staves on said former, substantially as and for the purpose described.

88. In a barrel-making machine, the combination of a former over which the staves and hoops are fed, devices for holding the staves to the former, a traveling cutter moving lengthwise of said former to joint the staves as they are held thereon, and attaching devices for securing the hoops to the staves while they are held on said former, substantially as and for the purpose described.

89. In a barrel-making machine, the combination of a slotted former over which the staves and hoops are fed, a cutter moving through the slot to joint the staves, and attaching devices for securing the hoops to the staves, substantially as and for the purpose described.

90. In a barrel-making machine, the combination of a slotted former over which the staves and hoops are fed, a traveling cutter moving lengthwise through the slot, and superimposed plungers carrying devices for attaching the hoops to the staves on said former, substantially as and for the purpose described.

91. In a barrel-making machine, the combination of a slotted former over which the staves and hoops are fed, a traveling cutter moving lengthwise through the slot, and superimposed plungers carrying devices for forcing portions of the hoop metal into the staves to secure the hoops to the staves, substantially as and for the purpose described.

92. In a barrel-making machine, the combination of a slotted former over which the staves and hoops are fed, a traveling cutter moving lengthwise through the slot, and superimposed plungers carrying clinching-arms for forcing points of the hoop metal into the staves to secure the hoops to the staves, substantially as and for the purpose described.

93. In a barrel-making machine, the combination of a slotted former over which the staves and hoops are fed, clamping devices for holding the staves to the former, feeding devices for forcing the staves over the former and beneath the clamping devices, a traveling cutter moving through the slot in the former, and superimposed plungers carrying clinching-arms for forcing points of the hoop metal into the staves to secure the hoops to the staves, substantially as and for the purpose described.

94. In a barrel-making machine, the combination of a slotted former having a bilge-shaped central portion over which the staves and hoops are fed, clamping devices for holding the staves to the former and bending them to conform to the shape thereof, a traveling cutter moving lengthwise through the slot in the former, and superimposed plungers carrying attaching devices for securing the hoops to the staves on said former, substantially as and for the purpose described.

95. In a barrel-making machine, the combination of a slotted former having a bilge-shaped central portion over which the staves and hoops are fed, clamping devices for holding the staves to the former and bending them to conform to the shape thereof, a traveling cutter moving lengthwise through the slot in the former in a line parallel with the surface of the former, and superimposed plungers carrying clinching-arms for forcing points of the hoop metal into the staves to secure the staves to the hoops, substantially as and for the purpose described.

96. In a barrel-making machine in which the hoops are formed from continuous pieces of hoop metal carried on reels or other supports and fed into the machine, the combination of die-blocks and superimposed plungers, between which the hoop metal is passed, and means for actuating said die-blocks and plungers to cut the interposed hoop metal into hoops and bend, loop, and connect the adjacent ends of the hoops of each series, a former over which the staves and hoops are fed, and attaching devices for securing the hoops to the staves, substantially as and for the purpose described.

97. In a barrel-making machine in which the hoops are formed from continuous pieces of hoop metal carried on reels or other supports and fed into the machine, the combination of vertically-reciprocating die-blocks carrying laterally-movable male dies, superimposed plungers having both vertical and lateral movement and provided with recesses arranged to fit over said male dies, and cams and connecting mechanism for actuating said vertically-movable die-blocks and superimposed plungers to cut the hoop metal into hoops and bend, loop, and reconnect the adjacent cut ends of the hoops of each series, substantially as and for the purpose described.

98. In a barrel-making machine into which the hoop metal is fed from continuous pieces carried on reels or other supports, the combination of cutting devices for cutting the hoop metal into hoops of proper length, a former over which the staves and hoops are fed, and devices for attaching the hoops to the staves on said former, substantially as and for the purpose described.

99. In a barrel-making machine into which the hoop metal is fed from continuous pieces carried on reels or other supports, the combination of cutting devices for cutting the hoop metal into hoops of proper length, a former over which the hoops are fed, and superimposed plungers carrying devices for attaching the hoops to the staves on said former, substantially as and for the purpose described.

100. In a barrel-making machine into which the hoop metal is fed from continuous pieces carried on reels or other supports, the combination of cutting devices for cutting the hoop metal into hoops of proper length, a former over which the staves and hoops are fed, and superimposed plungers carrying clinching-arms for forcing points of the hoop metal into the staves on said former to attach the hoops to the staves, substantially as and for the purpose described.

101. In a barrel-making machine in which the hoops are formed from continuous pieces of hoop metal carried on reels or other supports and fed into the machine, the combination, with devices for cutting the hoop metal into hoops of proper length and loosely reconnecting the adjacent cut ends of the hoops of each series, of a former over which the staves and hoops are fed and superimposed plungers carrying devices for attaching the hoops to the staves on said former, substantially as and for the purpose described.

102. In a barrel-making machine in which the hoops are formed from continuous pieces of hoop metal carried on reels or other supports and fed into the machine, the combination, with devices for cutting the hoop metal into hoops of proper length and loosely reconnecting the adjacent cut ends of the hoops of each series, of a former over which the staves and hoops are fed and superimposed plungers carrying devices for forcing portions of the hoop metal into the staves on said former to attach the hoops to the staves, substantially as and for the purpose described.

103. In a barrel-making machine in which the hoops are formed from continuous pieces of hoop metal carried on reels or other supports and fed into the machine, the combination, with devices for cutting the hoop metal into hoops of proper length and loosely reconnecting the adjacent cut ends of the hoops of each series, of a former over which the staves and hoops are fed and a superimposed plunger carrying clinching-arms for forcing points of the hoop metal into the staves on said former to attach the hoops to the staves, substantially as and for the purpose described.

104. In a barrel-making machine in which the hoops are formed from continuous pieces of hoop metal carried on reels or other supports and fed into the machine, the combination, with die-blocks and superimposed plungers, between which the hoop metal is passed, and means for actuating said die-blocks and plungers to cut the interposed hoop metal into hoops and bend, loop, and connect the adjacent cut ends of the hoops of each series, of a former over which the staves and hoops are fed and superimposed plungers carrying devices for forcing portions of the hoop metal into the staves on said former to attach the hoops to the staves, substantially as and for the purpose described.

105. In a barrel-making machine in which the hoops are formed from continuous pieces of hoop metal carried on reels or other supports and fed into the machine, the combination, with vertically-reciprocating die-blocks carrying laterally-movable male dies, superimposed plungers having both vertical and lateral movement and provided with recesses arranged to fit over said male dies, and cams and connecting mechanism for actuating said vertically-movable die-blocks, and superimposed plungers to cut the hoop metal into hoops and bend, loop, and reconnect the adjacent cut ends of the hoops of each series, of a former over which the staves and hoops are fed, and superimposed plungers carrying clinching-arms for forcing points of the hoop metal into the staves on said former to attach the hoops to the staves, substantially as and for the purpose described.

106. In a barrel-making machine into which the hoop metal is fed from continuous pieces carried on reels or other supports, the combination of cutting devices for cutting the hoop metal into hoops of proper length, a former over which the staves and hoops are fed, a series of punches interposed between the cutting devices and said former for punching attaching-points in the hoops as they are passed under said punches, and a plunger arranged over the former and carrying devices for forcing the attaching-points of the hoops into the staves on said former, substantially as and for the purpose described.

107. In a barrel-making machine in which the hoops are formed from continuous pieces of hoop metal carried on reels or other supports and fed into the machine, the combination, with devices for cutting the hoop metal into hoops of proper length and loosely reconnecting the adjacent cut ends of the hoops of each series, of a former over which the staves and hoops are fed, a cutter for jointing the staves, and devices for attaching the hoops to the staves, substantially as and for the purpose described.

108. In a barrel-making machine into which the hoop metal is fed from continuous pieces carried on reels or other supports, the combination of cutting devices for cutting the hoop metal into hoops, a former having a bilge-shaped central portion over which the staves and hoops are fed, devices for attaching the hoops to the staves on said former, and means interposed between the cutting devices and former for causing the path of travel of the central hoops from the cutting devices to the former to be of greater length than that of the outside hoops, for the purpose specified.

109. In a barrel-making machine into which the hoop metal is fed from continuous pieces carried on reels or other supports, the combination of cutting devices for cutting the hoop metal into hoops, a former having a bilge-shaped central portion over which the staves and hoops are fed, attaching devices for securing the hoops to the staves on said former, and a take-up device interposed between said former and the cutting devices and engaging the central hoops of the series to give increased length to those hoops, for the purpose specified.

110. In a barrel-making machine into which the hoop metal is fed from continuous pieces carried on reels or other supports, the combination of cutting devices for cutting the hoop metal into hoops, a former having a bilge-shaped central portion over which the staves and hoops are fed, superimposed plungers carrying devices for attaching the hoops to the staves on said former, and a take-up roller or wheel interposed between said former and the cutting devices and engaging the central hoops of the series to give increased length to those hoops, for the purpose specified.

111. In a barrel-making machine, the combination of the clamping-plunger $H'''$ and the clinching-plunger $J'''$, clinching-arms $L'''$, pivoted to the clamping-plunger and actuated by the clinching-plunger, and cams for actuating said plungers, substantially as and for the purpose described.

112. In a barrel-making machine, the combination of the former $D''$, having the bilge-shaped central portion and straight end portions, spring-guides $F'''$, feeding-arms $f''$, and means for actuating the same, substantially as and for the purpose described.

113. The combination of the former $D''$, having the bilge-shaped central portion and straight end portions, and spring-guides $F'''$, substantially as and for the purpose described.

114. The combination of the former $D''$, having the bilge-shaped central portions and straight end portions, spring-guides $F'''$, and adjusting-screws $G'''$, substantially as and for the purpose described.

115. The combination of the former $D''$, having the bilge-shaped central portion and straight end portions, the feeding-arms $f''$, arranged in guides on said former, and means for actuating the same, substantially as and for the purpose described.

116. In a barrel-making machine, the combination of the former $D''$, the superimposed clamping-plunger $H'''$ and clinching-plunger $J'''$, the clinching-arms $L'''$, pivoted to the clamping-plunger and actuated by the clinching-plunger, and cams for actuating said plungers, substantially as and for the purpose described.

117. In a barrel-making machine, the combination of the former $D''$, spring-guides $F'''$, feeding-arms $f''$ and means for actuating the same, superimposed clamping-plunger $H'''$ and clinching-plunger $J'''$, clinching-arms $L'''$, pivoted to the clamping-plunger and actuated by the clinching-plunger, and cams for actuating said plungers, substantially as and for the purpose described.

118. In a barrel-making machine, the combination of the former $D''$, having the bilge-shaped central portion and straight end portions and a slot $z'$, and the saw $A'''$, traveling lengthwise through said slot, substantially as and for the purpose described.

119. In a barrel-making machine, the combination of the former $D''$, having a slot $z'$, saw $A'''$, traveling lengthwise through said slot, spring-guides $F'''$, feeding-arms $f''$ and means for actuating the same, superimposed clamping-plunger $H'''$ and clinching-plunger $J'''$, clinching-arms $L'''$, pivoted to the clamping-plunger and actuated by the clinching-plunger, and cams for actuating said plungers, substantially as and for the purpose described.

120. In a barrel-making machine, the combination of the former $D''$, having the bilge-shaped central portion provided with a slot $z'$, the saw $A'''$, arbor-frame $J''$, slide-bed $I''$, hung on eccentric shafts $K''$, provided with crank-arms $M''$, cams $O''$, actuating said crank-arms through the medium of arms $N''$, the sleeve S'', provided with a lug C''' and carrying the frame T'', link Y'', connecting said frame with the arbor-frame J''', and cams E''', actuating the sleeve S'' and frame T'' through the medium of the arm D''', and link B''', connecting it to the lug C''', substantially as and for the purpose described.

121. In a barrel-making machine such as described, the combination of the die-block N, carrying the laterally-movable male die $x$, the plunger Q, having the recess $k'$ and carrying the clamping-follower U, and cams and connecting mechanism for giving vertically-reciprocating movement to the block N and vertical and lateral movement to the plunger Q, substantially as and for the purpose described.

122. In a barrel-making machine such as described, the combination of the block M, having a recess $t$, the die-block N, fitting in said recess and carrying the laterally-movable male die $x$, the plunger Q, having the recess $k'$, containing the spring-pressed follower $l'$ and carrying the clamping-follower U, and the cams and connecting mechanism for actuating the die-block N and plunger Q, substantially as and for the purpose described.

123. In a barrel-making machine such as described, the combination, with the die-block N, carrying the laterally-movable male die $x$, the plunger Q, having the recess $k'$ and carrying the clamping-follower U, and the cams and connecting mechanism for actuating the block N and plunger Q, of the former D'', superimposed clamping-plunger H''' and clinching-plunger J''', clinching-arms L''', pivoted to the clamping-plunger and actuated by the clinching-plunger, and cams for actuating said plungers, substantially as and for the purpose described.

124. In a barrel-making machine such as described, the combination of the die-block N, carrying the laterally-movable male die $x$, the plunger Q, having the recess $k'$ and carrying the clamping-follower U, the clamping-plunger V, and cams and connecting mechanism for giving vertically-reciprocating movement to the plunger V and block N and vertical and lateral movement to the plunger Q, substantially as and for the purpose described.

125. In a barrel-making machine such as described, the combination, with the hoop-cutting, stave-feeding, and hoop-attaching devices, of the reels K, carrying the hoop metal and provided with the tension devices L, each consisting of a coiled spring surrounding the shaft upon which the reel is supported and revolves and bearing against the side of the reel, and a thumb-nut on the end of said shaft for pressing the coiled spring against the side of the reel, substantially as and for the purpose described.

126. In a barrel-making machine, the semi-cylindrical former D'', provided with the slot $z'$ for the passage of the cutter, and having a straight horizontal lower edge on the side which receives the staves from the feeding devices, and a bilge-shaped upper and central portion, substantially as and for the purpose described.

127. In a barrel-making machine such as described, the combination, with the cutting devices, the barrel-former, and the superimposed plungers carrying the clinching-arms, of the plungers W, provided with the punches $a''$ and interposed between the cutting devices and the former, substantially as and for the purpose described.

128. In a barrel-making machine such as described, the combination, with the hoop-cutting devices, the barrel-former, and the hoop-attaching devices for securing the hoops to the staves on said former, of the take-up wheel B'', interposed between the cutting devices and the former and engaging the central hoops of the series, substantially as and for the purpose described.

129. In a barrel-making machine such as described, the combination of the shaft E, shaft H, clutch mechanism connecting said shafts and arranged to impart a single rotation to the shaft H for each given number of rotations of the shaft E, the plungers H''' and J''', clinching-arms L''', feeding-arms $f''$, traveling cutter A''', the cam devices secured to the shaft E and actuating all of said parts, the die-block N, plunger Q, and cam devices secured to the shaft H for actuating said die-block and plunger, substantially as and for the purpose described.

130. In a barrel-making machine such as described, the combination of a single driving worm-shaft F, the shafts E, each provided with a worm-wheel meshing with the worms on the shaft F, the shafts H, journaled concentric with the shafts E and connected thereto by clutch devices arranged to impart a single rotation to the shafts H for each given number of rotations of the shafts E, and cam devices secured to the shafts E and H for actuating the various parts of the machine, substantially as and for the purpose described.

HENRY J. GILBERT.

Witnesses:
N. S. WOOD,
G. W. BURNHAM.